March 19, 1940.　　　C. J. WERNER　　　2,194,372
CONTROL SYSTEM
Original Filed Aug. 19, 1935
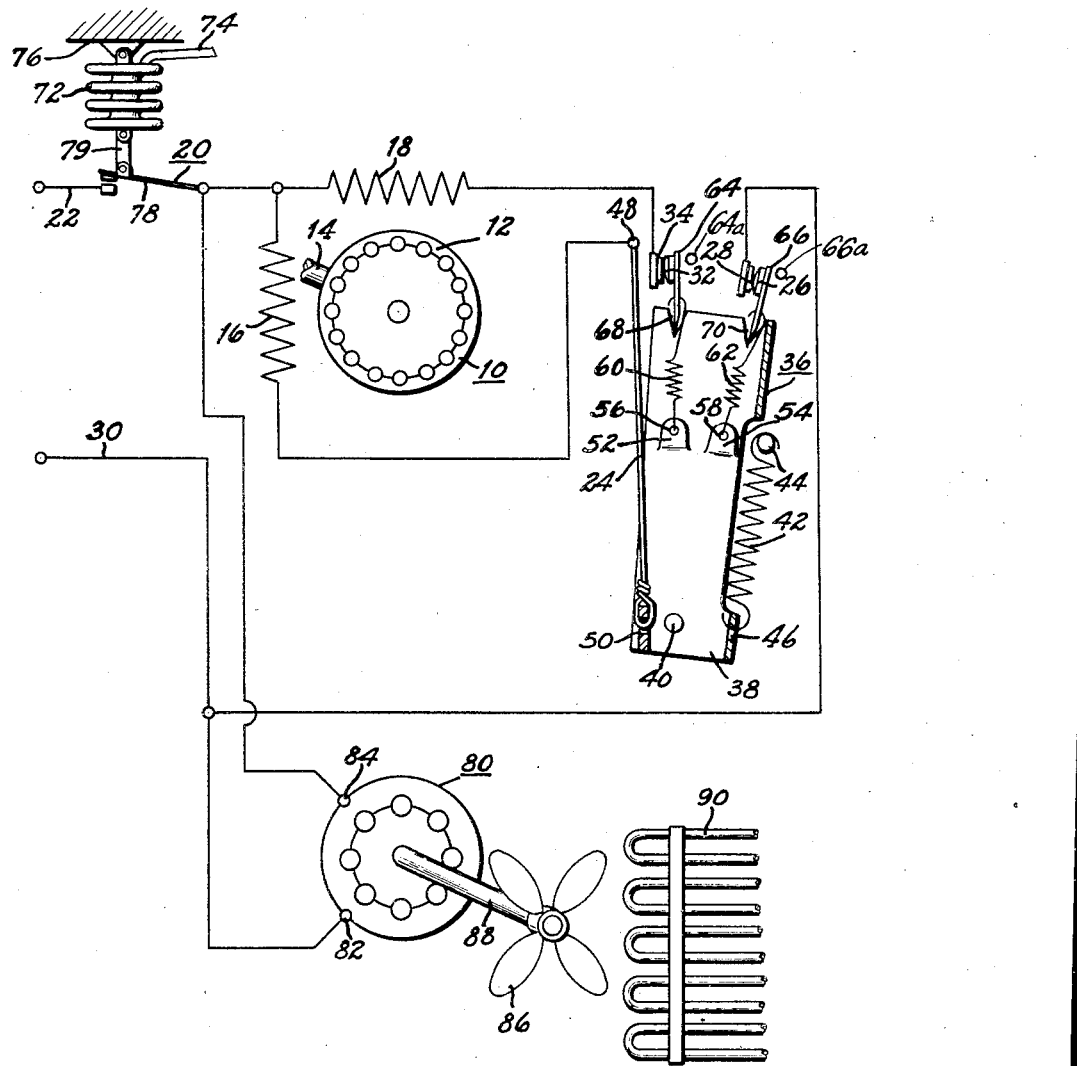
INVENTOR
Calvin J. Werner.
BY
Spencer Hardman & Jehn
his ATTORNEYS Patented Mar. 19, 1940

2,194,372

UNITED STATES PATENT OFFICE 2,194,372

CONTROL SYSTEM

Calvin J. Werner, Dayton, Ohio, assignor to General Motors Corporation, Detroit, Mich., a corporation of Delaware Application August 19, 1935, Serial No. 36,857
Renewed October 14, 1938

7 Claims. (Cl. 62—4)

This invention relates to control systems, and more particularly to control systems for controlling the cooperative operation of a plurality of energy translating devices.

In some refrigerating systems it is desirable to use a fan for cooling the condenser of the refrigerating system that is driven independently of the prime mover that drives the compresser. In such systems, it has been common to connect the fan driving motor across the main field winding of the motor that drives the compressor.

However, it is very desirable to utilize a device to protect the main or compressor driving motor from overload, as in the system of the present invention and it has been found very advantageous to connect the fan motor intermediate the main control switch and the overload protective device, so that the fan motor is responsive to the main control switch, but not responsive to the overload protective device. By such connections of the parts of the system, the fan continues to operate, even though some overload or faulty condition in the system causes the main or compressor driving motor to stop, and with an automatic resetting overload control switch, to start at intervals until the overload is corrected or overcome. Under such circumstances the continued operation of the fan continues to cool the compressor and condenser of a refrigerating system to effect lower head pressure and improve load conditions. Furthermore, by the use of a protective switch for the motor which automatically resets at intervals, the fan continues to operate to cool the refrigerating system and improve pressure conditions therein while the compressor motors cycle on and off due to overload thereon which may be caused by excessive pressure in the system. The system also, of course, tends to cool the overloaded main driving motor more quickly.

It is therefore an object of this invention to provide an electrical control system for a main driving motor and a fan motor of refrigerating apparatus, which system has a main control switch responsive to the refrigerating apparatus and an automatic resetting overload protective device for the main driving motor, said system being so connected that the main driving motor and fan motor are both responsive to the main control switch, while the main driving motor only is responsive to the automatic resetting overload protective device.

Another object of this invention is to provide an electrical control system for a main driving motor and a fan motor of refrigerating apparatus, said system having a switch responsive to the refrigerating apparatus for controlling the operation of both of the motors and a thermal responsive switch for controlling the starting of the main driving motor, as well as providing automatic overload protection for the main driving motor and effects intermittent starting of the main driving motor while the overload exists, said system being so connected that the fan motor continues to operate during the intervals of time in which the main driving motor is stopped by said switch due to overload.

Another object of this invention is to provide a system for controlling the operation of a plurality of motors, in which system both of said motors are responsive to a main control switch, while only one of said motors is responsive to an automatic resetting overload protective switch.

From the following description it will be understood that the foregoing objects are accomplished in the disclosed embodiment of this invention by a system including a main control switch for controlling the power circuits to a main or compressor driving motor and to an auxiliary or fan driving motor and an automatic thermal responsive overload protective switch which controls the circuit to only the main or compressor driving motor, said automatic thermal responsive switch being of a type which automatically resets or closes to start the main or compressor driving motor after it has been stopped thereby due to an overload, and continues to thus open and close the main or compressor driving motor circuit as long as the overload continues, during which time of overload the fan motor continues to operate to cool the parts of the system and reduce the head pressure to thereby improve the operating conditions thereof. The system also preferably includes the control of the starting and running circuits of the main or compressor driving motor with the same switch, and responsive to the same thermal responsive element that is used for the overload protection. This is a feature of the system which promotes more dependable and efficient control with a very desirable economy of apparatus.

Further objects and advantages of the present invention will be apparent from the following description, reference being had to the accompanying drawing wherein a preferred embodiment of the present invention is clearly shown.

In the drawing:

The single figure is a schematic circuit diagram of a control system embodying a preferred form of the present invention, and illustrating the adaptation thereof to refrigerating apparatus.

With particular reference to this single figure, a motor 10 has a rotor 12 that is preferably of the squirrel cage type and rotatably mounted on a shaft 14. A main field winding 16 and a starting or auxiliary field winding 18 are magnetically associated with the rotor 12. One end of the main field winding 16 is connected to one end of the starting or auxiliary field winding 18 and through a main control switch 20 to a power supply line lead 22. The other end of the main field winding 16 is connected through a thermal-responsive element 24 and cooperating contacts 26 and 28 to a power supply line lead 30. The other end of the auxiliary field winding 18 is connected to the power supply line lead 30 through cooperating contacts 32 and 34 and the cooperating contacts 26 and 28.

The thermal-responsive elements 24, cooperating contacts 26 and 28, and cooperating contacts 32 and 34 are parts of a starting and overload thermo-electric control switch 36. This switch 36 is more fully disclosed and described in my Patent No. 2,095,579, which issued Oct. 12, 1937, and relates to a control system, but will be described here in sufficient detail to make its construction and operation understandable to those skilled in the art, and with particular reference to the present system. The switch 36 has a main support member 38 movably pivotally mounted on a pivot member 40 and resiliently urged in one direction about the pivot member 40 by the spring 42, which spring is anchored at one end to a pin 44 or other suitable means and at its other end in an aperture 46 provided in the main support member. The thermal-responsive element 24 is preferably a resistance wire that is heated by a current flow therethrough and that expands with increase of the temperature thereof. This thermal-responsive element is anchored at 48 and extends through an aperture 50 in the main support member 38, so that it restrains and controls the movement of the main support member that is effected by the spring 42. Lugs 52 and 54 are preferably punched from the main support member 38 and have openings 56 and 58 respectively, therein which provide anchors for tension springs 60 and 62 respectively; the other ends of which tension springs are secured to movable contact carrying members 64 and 66. Stop members 64a and 66a are provided for arresting movement of members 64 and 66 away from their associate stationary contacts 34 and 38 respectively. The ends of the contact carrying members 64 and 66 engage V-shaped notches 68 and 70 respectively, in the main support member to provide substantially frictionless pivotal supports for the contact carrying members. Contacts 32 and 26 are mounted on the contact carrying members 64 and 66 respectively. The longitudinal axes of the springs 60 and 62 are so related to the longitudinal axes of the contact-carrying members 64 and 66 respectively, that the longitudinal axes of the respective contact carrying members and their springs cross after predetermined movements of the main support member 38 to effect snap action of the contact carrying members. The normal angular relation of the longitudinal axes of the contact carrying members to the longitudinal axes of their respective springs is preferably such that the contacts 32 and 34 disengage and engage prior to the contacts 26 and 28, upon movement of the main support member 38 to effect such disengagement and engagement.

Since the control system is illustrated as it might be applied to conventional refrigerating apparatus, the main or thermo-pressure responsive control switch 20 is illustrated as being controlled from the refrigerating apparatus by a Sylphon 72, which Sylphon is connected to the refrigerating apparatus by the pipe 74 so as to provide a conventional pressure-controlled thermal-responsive switch. One end of the Sylphon is anchored at 76, while the other end is connected to a movable arm 78 of the switch 20 through a link 79.

In the present system, a second motor 80, that may be of any suitable type, such as a conventional shaded pole induction motor, has one terminal 82 connected to the power supply line lead 30 and another terminal 84 connected to the power supply line lead 22 through the main control switch 20, so that the motor 10 and the motor 80 are both controlled by the main control switch. In the adaptation of this system to refrigerating apparatus, the motor 80 has a fan 86 mounted on a shaft 88 to be driven by the motor to cool the refrigerating apparatus, such as a condenser, a portion of which is indicated at 90.

In the operation of this system, when adapted to refrigerating apparatus, the main or thermo-pressure switch 20 is closed in response to a change of pressure in the refrigerating apparatus that is transmitted through the pipe 74 in the Sylphon 72. This closes the circuit to the motor 80 to start the operation thereof independently of the switch 36. Both sets of contacts of the thermo-electric switch 36 are normally closed, as shown in the drawing. Since the main control or thermo-pressure switch 20 also closes the circuit to the motor 10, that motor begins to operate. The thermal-responsive element 24 is so designed that when the main field winding current flows therethrough for a predetermined length of time at normal line voltage, the thermal-responsive element expands by an amount sufficient to effect movement of the main support member 38 about the pivot 40 to actuate the contact carrying member 64 and effect disengagement of the contacts 32 and 34 to open the circuit to the starting or auxiliary field winding 18. Thus, when the contacts 32 and 34 and the contacts 26 and 28 are closed, the starting circuit of the motor 10 is established; and when the contacts 32 and 34 are disengaged, the running circuit of the motor is established. The thermal-responsive element 24 is also so designed that the disengagement of the contacts 32 and 34 is effected after the rotor reaches a predetermined speed. Under normal operating conditions, the thermal-responsive element 24 does not expand by an amount sufficient to effect disengagement of the contacts 26 and 28. However, in case of some abnormal condition, such as an overload on the motor 10, the increase of main field winding current caused by the abnormal condition increases the current flow through the thermal-responsive element, whereupon further expansion of the thermal-responsive element effect disengagement of the contacts 26 and 28 to open the circuit to the main field winding 16 and stop the motor.

As previously mentioned, if both sets of contacts on the switch 36 become disengaged, the contacts 34 and 32 preferably reset prior to the contacts 26 and 28, so that the main field winding 16 will not be connected across the power supply leads 22 and 30 when the rotor is stationary and the circuit to the starting or auxiliary field winding 18 is open. The switch 36 automatically resets when the main switch 20 is opened, or after the opening of the contacts 26 and 28 have stopped the motor, because when the main field winding circuit is open, there is no current flow through the thermal-responsive element, and the cooling of the thermal-responsive element naturally causes a contraction thereof to reset the contacts of the switch 36.

The thermo-electric switch 36 thus controls the starting and running circuits of the motor 10, and protects the motor 10 from abnormal conditions, such as an overload. However, although some abnormal condition stops the motor 10, the motor 80 continues to operate as long as the thermo-pressure switch 20 is closed. This continued operation of the motor 80, as in the case of driving the fan for cooling refrigerating apparatus, is very desirable, even when the main driving motor, such as 10, is not in operation. By continuing to run, the fan cools the refrigerating apparatus to reduce the head pressure, and will thereby tend to decrease the load. It also tends to reduce damage from overheating of the apparatus under abnormal conditions.

While the embodiment of the present invention as herein disclosed, constitutes a preferred form, it is to be understood that other forms might be adopted, all coming within the scope of the claims which follow.

What is claimed is as follows:

1. In a device of the character described, the combination with refrigerating apparatus, of a main driving motor for said apparatus, said motor having a main field winding and starting and running circuits; a switch having a thermal responsive element connected in series with the main field winding, said switch having two separate sets of contacts, one for controlling the starting circuit, the other providing overload protection for the main driving motor, said thermal responsive element controlling the opening and closing of both sets of contacts; a second motor provided with a fan for cooling the refrigerating apparatus; and a main control switch adapted, in responsive to variations in the temperature of a part of the refrigerating apparatus, automatically to control both motors, the second motor being independent of the first mentioned switch.

2. In a device of the character described, the combination with refrigerating apparatus, of a motor for operating said refrigerating apparatus and having starting and running circuits; an automatic resetting, thermal responsive switch including means for controlling the starting and running circuits, certain of said means providing overload protection for the said motor; a second motor having a fan for cooling a portion of the refrigerating apparatus, said motor being independent of the said switch; and thermal responsive means adapted to control both motors in accordance with temperature changes.

3. In a device of the character described, the combination with refrigerating apparatus; of a driving motor for said apparatus, and having starting and running circuits; a switch providing two separate sets of contacts adapted to be closed simultaneously and opened successively, the set of contacts adapted to open first controlling only the starting circuit, the running circuit including the other set of contacts; a thermal responsive element effecting operation of the switch and connected in series with the running winding of the said driving motor and adapted to open both sets of contacts of the switch to provide overload protection for said motor; a second motor provided with a fan for cooling a part of the refrigerating apparatus; and a thermal responsive control switch independent of the first mentioned switch adapted to control the circuit to both motors.

4. In a device of the character described, the combination with refrigerating apparatus, two separate and distinct motors, one provided with a fan for cooling a portion of the refrigerating apparatus, the other adapted to drive the refrigerating apparatus and having starting and running windings; a control switch for the last mentioned motor, said switch having two separate sets of contacts adapted to be closed simultaneously and opened successively, both sets acting in series to complete the circuit through the starting winding, the running winding being controlled solely by the set of contacts adapted to be opened last, the set of contacts first to open providing overload protection for the last mentioned motor; a thermo-responsive element in series connection with the said running winding and operatively secured to the switch to effect its operation to open and close its contacts; and a thermo-pressure actuated switch, independent of the said control switch and adapted to control the circuit to both motors.

5. In a device of the character described, the combination with refrigerating apparatus including a fan for cooling a part of said apparatus; two separate electric motors, one for actuating the refrigerating apparatus the other for operating the heat dissipating fan; a switch for controlling the said one motor and adapted to protect it against abnormal operating conditions; and a second switch independent of the first and controlled by the refrigerating apparatus for simultaneously connecting or disconnecting both of said motors to or from a power circuit, said second switch being adapted to maintain the fan driving motor for heat dissipation purposes regardless of the status of the first mentioned switch.

6. In a device of the character described, the combination with refrigerating apparatus provided with a fan for cooling a part of said apparatus; two separate electric motors, one of which drives the refrigerating apparatus the other the cooling fan; a switch for automatically controlling the electric motor which drives the refrigerating apparatus, said switch being adapted to protect said motor against abnormal operating conditions and overload; and a second switch controlled by the refrigerating apparatus and adapted to render the cooling fan motor effective regardless of the condition of the first mentioned switch.

7. In a device of the character described, the combination with refrigerating apparatus having a motor-driven compressor and a motor-driven fan for dissipating heat from portions of a refrigerating apparatus; means adapted automatically to control the compressor motor and to render the same inoperative under abnormal load conditions; and means controlled by the refrigerating apparatus for rendering both the compressor motor and the fan motor effective for normal refrigeration operation and adapted also to maintain the fan motor operative to continue its dissipation of heat while the compressor motor is inoperative under abnormal operating conditions.

CALVIN J. WERNER.